United States Patent
Kim et al.

(10) Patent No.: US 6,430,342 B1
(45) Date of Patent: Aug. 6, 2002

(54) FIBER GRATING AND FIBER OPTIC DEVICES USING THE SAME

(75) Inventors: Byoung Yoon Kim; In Kag Hwang, both of Taejon (KR)

(73) Assignees: Korea Advanced Institute of Science and Technology; Donam Systems Inc., both of (KR)

( * ) Notice: Subject to any disclaimer, the term of this patent is extended or adjusted under 35 U.S.C. 154(b) by 0 days.

(21) Appl. No.: 09/462,603

(22) PCT Filed: May 8, 1999

(86) PCT No.: PCT/KR99/00224

§ 371 (c)(1),
(2), (4) Date: Jan. 10, 2000

(87) PCT Pub. No.: WO99/59010

PCT Pub. Date: Nov. 18, 1999

(30) Foreign Application Priority Data

May 9, 1998 (KR) .............................. 98-16591

(51) Int. Cl.$^7$ .............................. G02B 6/34; G02B 6/26
(52) U.S. Cl. .............................. 385/37; 385/7; 385/28; 385/39
(58) Field of Search .............................. 385/11, 28, 29, 385/31, 37, 40; 359/569–575

(56) References Cited

U.S. PATENT DOCUMENTS

| | | | |
|---|---|---|---|
| 4,915,468 A | * 4/1990 | Kim et al. | 385/28 |
| 5,007,705 A | 4/1991 | Morey | 350/96.29 |
| 5,411,566 A | 5/1995 | Poole et al. | 65/402 |
| 6,021,237 A | * 2/2000 | Kim et al. | 385/28 |
| 6,050,109 A | * 4/2000 | Kosinski et al. | 65/385 |
| 6,130,974 A | * 10/2000 | Rivoallan | 385/37 |
| 6,151,427 A | * 11/2000 | Satorius | 385/7 |

OTHER PUBLICATIONS

Huang et al, Modeling and Analysis of Fiber–Optic Mode Transducers: Slngle Fiber with Periodic Perturbations, Nov. 1991, Journa of Lightwave Technology, vol. 9, No. 11.*

Optics Letters, vol. 8, No. 12, Dec. 1983, pp. 656–658, totality R.C. Youngquist Et. ao.: "Birefringent–fiber polarization coupler".

Optic Letters, vol. 11, No. 6, Jun. 1986, pp. 389–391, totality, B.Y.Kim et al.: "All–fiber acousto–optic frequency shifter".

* cited by examiner

Primary Examiner—Rodney Bovernick
Assistant Examiner—Juliana K. Kang
(74) Attorney, Agent, or Firm—Marger Johnson & McCollom, P.C.

(57) ABSTRACT

The present invention relates to a fiber grating which introduces a plurality of asymmetric microbends in a fiber. The present invention also relates to fiber optic devices, such as a fiber-optic filter, a fiber-optic polarizer, a fiber-optic wavelength tunable bandpass filter, a fiber-optic frequency shifter, using the above fiber grating which has asymmetric mode-coupling characteristics. The optical devices of the present invention exhibit a high mechanical durability and a long-term stability of the device, degradation of the optical fiber device due to a change in the characteristics of the grating can be prevented even after a long time at high temperature. In particular, the fiber grating according to the present invention has asymmetric mode coupling characteristics, so that it can be prevalently applied to an optical fiber notch filter, an optical fiber polarizer, an optical fiber wavelength tunable bandpass filter, an optical fiber frequency shifter and so on.

14 Claims, 5 Drawing Sheets

FIBER GRATING AND FIBER OPTIC DEVICES USING THE SAME

TECHNICAL FIELD

The present invention relates to a fiber optic element, more specifically to a fiber grating that couples a light mode propagating along a fiber into another mode by a plurality of microbends formed in the fiber.

The present invention also relates to optical devices, more specifically to fiber optic devices, such as a fiber-optic filter, a fiber-optic polarizer, a fiber-optic wavelength tunable bandpass filter, a fiber-optic frequency shifter, using the above fiber grating which has asymmetric mode-coupling characteristics.

BACKGROUND ART

Recently, increasing use is made of fiber Bragg gratings in various fiber-optic applications such as telecommunications, fiber sensors and lasers. The fiber Bragg grating consists of a periodic stack of regions of higher and lower refractive index along an optical fiber. Gratings are made by exposing the core of a fiber to an interference pattern of strong laser light. It has the property of reflecting light within a narrow band of wavelengths and transmitting all wavelengths outside of that band. The central reflected wavelength is equal to twice the period of the grating, multiplied by the fiber refractive index. For example, a grating reflecting at 1560 nm would have a period of about 535 nm. Most of the fiber Bragg gratings have periods of a few 100 nanometers.

On the other hand, a long period fiber grating has a period of a few 100 microns. The long period fiber grating couples a specific wavelength light, propagating along the core of the grating, into a cladding mode of the same propagating direction. The long period fiber grating can act as a band-rejection filter since the coupled cladding mode can easily be stripped. These long period fiber gratings have the advantages of easy fabricating, reduced fabricating cost and compact size. They will therefore be useful in many applications including the gain-flattening filter of optical amplifiers.

Hereinafter, the conventional methods for fabricating these long period fiber gratings will be explained in brief as follows:

[Method Using the Photosensitivity of Optical Fibers]

FIG. 1 shows the cross section of a conventional fiber grating that is fabricated using the photosensitivity of a single-mode optical fiber. In principle, this method is the same as the conventional method for fabricating fiber Bragg gratings. However, this method should employ a specific optical fiber including a fiber core with photosensitivity enhanced by doping therein Germanium(Ge) or the like.

Referring to FIG. 1, the side of a single-mode optical fiber is exposed to the light 10 of an excimer laser. The molecular structure of the exposed portions 30 in the fiber core 20 is deformed, thereby the portions 30 have higher refractive index. Thus, by irradiating the fiber with uniformly spaced laser light along the fiber axis, a single-mode fiber grating 40 with a periodically varying refractive index can be obtained. This grating couples a specific wavelength light, propagating along the core of the grating, into a cladding mode. Therefore, this grating can act as a filter.

FIG. 2 shows the cross section of another conventional fiber grating that is fabricated using the photosensitivity of a two-mode optical fiber. The two-mode fiber grating 40' is also fabricated by the same manner as that of the single-mode fiber grating. The fiber grating 40' can couple the fundamental $LP_{01}$ mode into the second-order $LP_{11}$ mode, since the regions 30' of higher refractive index are asymmetrically formed along the fiber axis.

However, the fiber gratings fabricated by this method have a disadvantage that the gratings are erased with the passage of time. In addition, it is difficult to make shorter fiber gratings because they have low mode coupling efficiency.

[Method Using the Thermal Expansion of Fiber Core]

These fiber gratings are fabricated using the thermal diffusion of the dopants in the fiber core. When the core is strongly heated, the core expansion is induced by the thermal diffusion of the dopants.

FIG. 3 shows the procedure of fabricating such a fiber grating. Referring to FIG. 3, the core 22 of an optical fiber is locally heated to form a core portion 24 with a larger radius by the light 12 from a high power laser. The light 22 is periodically scanned along the fiber axis. For efficient local heating, a convex lens C focusing the light 12 can be used together with the high power laser. Instead of the laser heating method, electric arc method may be used.

However, the fiber gratings fabricated by this method have a disadvantage that special optical fibers doped with an element of low molecular weight such as nitrogen should be used to enhance the thermal expansion effect of the core.

[Method Using the Index Change Due to the Stress Removal]

In fabricating an optical fiber, if the fiber is cooled in a state that tensile force is applied to the fiber, stress will exist in the core of the fabricated fiber because of the difference of cooling speed between the core and cladding. The stress can be removed by reheating the fiber, raising the refractive index of the core. Fiber gratings can be fabricated using the above phenomenon. That is, heating an optical fiber locally using a high power laser or an electric arc can induce the refractive index change.

However, this method should be applied to an optical fiber with a core made of pure silica that is not doped with germanium or the like.

[Method Using the Periodic Deformations of Fiber Core]

It is well-known that closely spaced microbends in the fiber core, which are introduced using two deformers with teeth thereon, can couple a core mode into a cladding mode or other core modes. In this case, the symmetric core mode $LP_{01}$ can be coupled into asymmetric modes such as $LP_{11}$, $LP_{21}$ and $LP_{31}$ since asymmetric deformations are introduced along the fiber axis.

A schematic illustration of this fiber grating is shown in FIG. 4. Referring to FIG. 4, an optical fiber 60 is inserted between two deformers 50 with periodic teeth thereon. The fiber 60 is bent to form microbends by the pressure F applied to the deformers 50. However, the fiber gratings fabricated by this method exhibit unstable performance characteristics depending upon the pressure applied to the deformers.

Another method was therefore suggested that could obtain better stability in the periodic deformations. FIG. 5 shows the procedure of introducing periodic deformations in the fiber core by another method. Referring to FIG. 5, grooves G made by a $CO_2$ laser are spaced apart by an equal spacing. The grooves G are heated by the electric arc A of electrodes 70 vertically disposed on both sides of the optical fiber. The heated groove is melt to deform the fiber core due to surface tension as shown in the left side of the electrodes 70. This method base on the physical deformation are applicable to almost all types of optical fibers, but a high power laser is required to make grooves on the fiber. Additionally, the grooves made on the fiber-weaken the overall strength of the completed grating to resist torsion, bending and the like loads. As described above, the conventional fiber gratings have the disadvantages of poor characteristics and complexities in the fabrication process.

DISCLOSURE OF INVENTION

It is therefore an object of the present invention to provide an improved fiber grating which can be fabricated by simple process.

Another object is to provide a variety of improved optical devices realized by using the above fiber grating.

In order to accomplish the aforementioned object, the present invention provides a fiber grating for inducing a coupling between different light modes, comprising: a length of an optical fiber; and a plurality of stepped microbends formed along the length of the optical fiber, each of the microbends being stress relieved.

The microbends may be spaced apart by a periodic distance substantially equal to a beat length of the different modes to be coupled and the number of the microbends may be preset to obtain a perfect mode-coupling. Otherwise, the microbends may be spaced apart by nonuniform distances.

The stress imposed by the microbends can be relieved to different degrees.

The stepped microbends preferably are formed by locally heating the optical fiber in a state that mechanical stress due to force acting on the side of the fiber is imposed on the fiber. More preferably, the local heating is carried out using an electric arc discharger, and most preferably, the microbends are heated with different arc intensity so as to relieve the stress to different degrees.

In order to accomplish another object, the present invention provides an optical fiber device having a polarization-dependent mode-coupling ratio, comprising: a length of an optical fiber having polarization-dependent effective refractive index; and a plurality of stepped microbends formed along the length of the optical fiber. In the device, each of the microbends is stress relieved and the microbends are spaced apart by a periodic distance substantially equal only to a beat length of two coupling modes for any one polarization component. Preferably, the optical fiber is a polarization maintaining optical fiber or an elliptic core optical fiber. The device can further comprise a mode stripper for removing mode converted polarization component.

The optical devices which can be realized by the above fiber grating include an optical fiber wavelength tunable bandpass filter comprising: an acoustic grating made by introducing a flexural acoustic wave into a single mode fiber, the acoustic grating having predetermined wavelength width and tunable center wavelength for a mode conversion of a passing light; a fiber grating connected to the acoustic grating in series, the fiber grating inducing a mode coupling asymmetric to its own axis, the fiber grating having a mode conversion wavelength width broader than that of the acoustic grating; and a mode stripper for removing an asymmetric mode light passed through both the fiber grating and acoustic grating; wherein the band pass filter passes only light of the predetermined mode conversion wavelength width at a desired wavelength.

The fiber grating used in the optical fiber wavelength tunable bandpass filter may be the same as described above.

Another example of the optical devices which can be realized by the above fiber grating is an optical fiber frequency shifter comprising: an acoustic grating made by introducing a flexural acoustic wave into a single mode fiber, the acoustic grating producing both mode conversion and frequency shift for a passing light; and a fiber grating connected to the acoustic grating in series, the fiber grating inducing a mode coupling asymmetric to its own axis so as to reconvert the mode converted in the acoustic grating into its original mode without frequency shift.

The fiber grating used in the optical fiber frequency shifter may also be the same as described above.

BEST MODE FOR CARRYING OUT THE INVENTION

When the effective refractive index for a fiber core mode $LP_{01}$ is represented by $n_{01}$, and the effective refractive index for a mode $LP_{mn}$ coupled to the core mode is represented by $n_{mn}$, the relationship between the period $\Lambda$ of a fiber grating and the center wavelength $\lambda$ of mode-conversion is shown as in the following Equation 1:

$$\Lambda = \frac{\lambda}{n_{01} - n_{mn}} \quad \text{[Equation 1]}$$

Thus, the period of the grating suitable to a specific optical fiber, a desired mode, and a desired wavelength must be selected to induce a desired mode coupling. However, in the optical fiber grating according to the present invention, a core mode is coupled to only an asymmetric mode (e.g. $LP_{11}$, $LP_{21}$, $LP_{31}$, ...).

Figure 1:
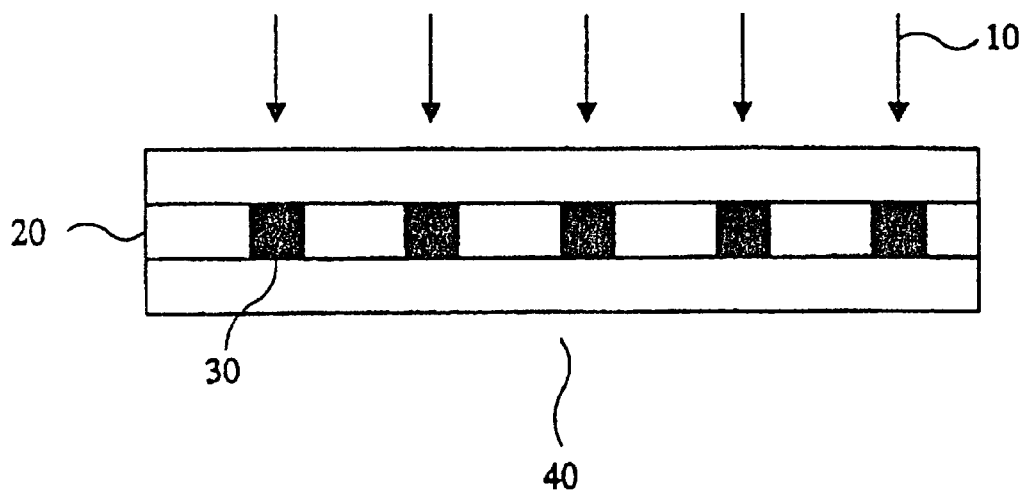
FIG. 1 is a cross sectional view of a conventional fiber grating that is fabricated using the photosensitivity of a single-mode optical fiber.
Figure 2:
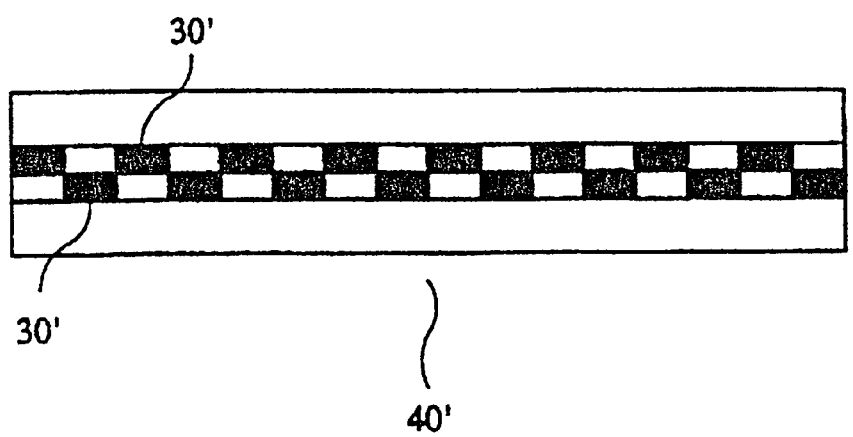
FIG. 2 is a cross sectional view of another conventional fiber grating that is fabricated using the photosensitivity of a two-mode optical fiber.
Figure 3:
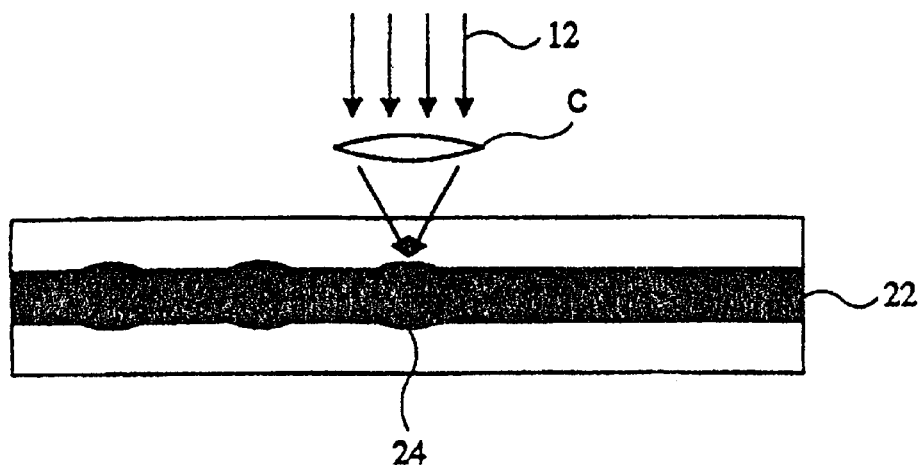
FIG. 3 shows the procedure of fabricating another conventional fiber grating using thermal expansion of a fiber core.
Figure 4:
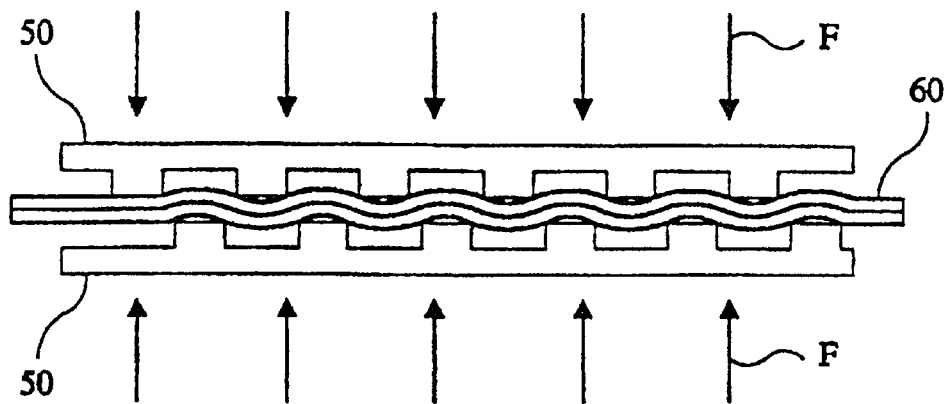
FIG. 4 shows a conventional method of introducing periodic deformations in the fiber core.
Figure 5:
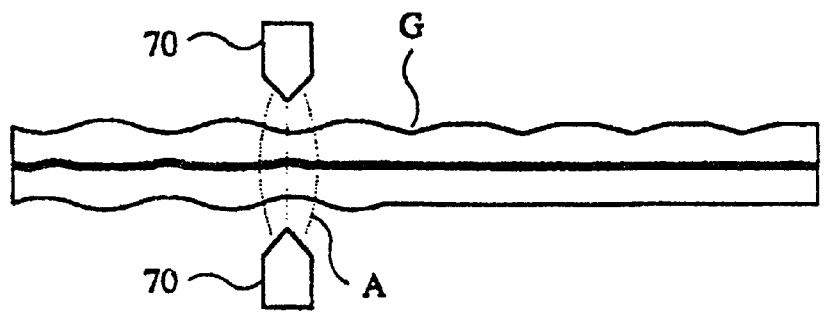
FIG. 5 shows another conventional method of introducing periodic deformations in the fiber core.
Figure 6A:
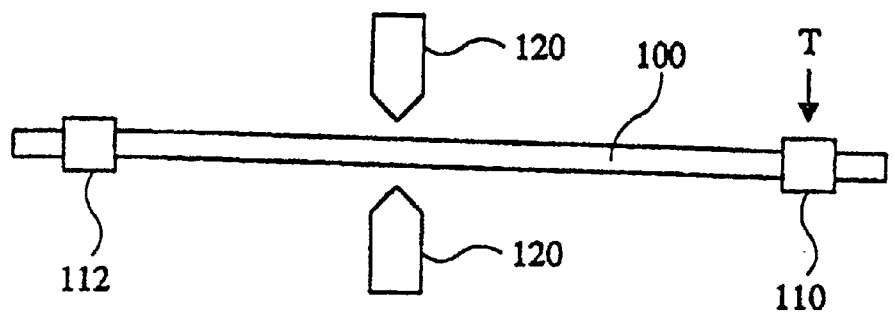
FIGS. 6A through 6C show a process for fabricating the fiber grating of the present invention.
Figure 6B:
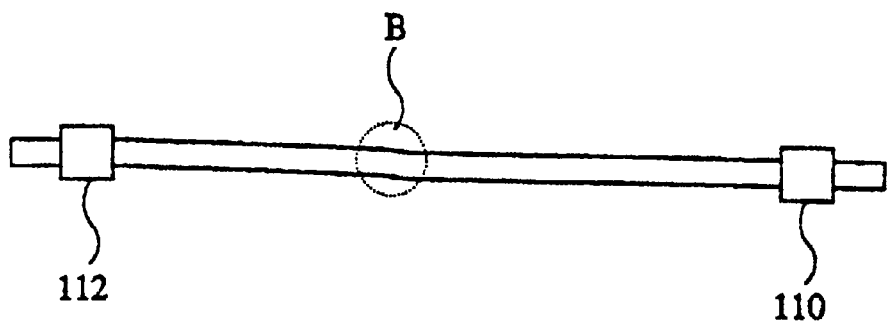
Figure 6C:
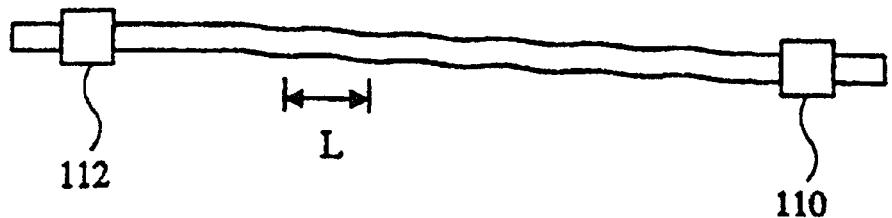

The fiber grating according to the present invention will now be described referring to FIGS. 6A through 6C showing a process for fabricating the fiber grating of the present invention.

First, a suitable optical fiber is selected among various optical fibers such as a conventional communication grade optical fiber, an optical fiber doped with a special material, a polarization maintaining optical fiber, an elliptic core optical fiber, an elliptic cladding optical fiber, a dispersion compensation optical fiber, a dispersion transition optical fiber, and a dual mode optical fiber. Next, the jacket of the optical fiber is stripped, and the optical fiber is then fixed by two optical fiber fixing boards.

Here, an induced stress generated by bending the optical fiber must not be applied to the fixed optical fiber. If the stress exists, it should be entirely removed by heating the optical fiber with torch flames.

As shown in FIG. 6A, one fixing board 110 is moved in parallel in a direction (T) perpendicular to the axis of a jacket-stripped optical fiber 100, to thus induce a stress due to a step difference to the optical fiber between the two fixing boards 110 and 112. Here, a stress due to bending can be induced to the optical fiber by turning the two fixing boards 110 and 112 toward each other at a predetermined angle.

When an electrical arc is generated by applying a predetermined voltage to electrodes 120 vertically disposed on both sides of the optical fiber 100, a portion of the optical fiber in contact with the electrical arc is melt to form a stepped microbend B on the optical fiber between the two fixing boards 110 and 112 by a stress due to a step difference as shown in FIG. 6B.

If an electrical arc is periodically generated by moving the electrodes in the lengthwise direction of the optical fiber, a fiber grating with a grating period of L can be completed as shown in FIG. 6C. The grating period can be irregular to obtain a desired filter spectrum.

The microbends are periodically formed at the same spacing as the beat length between different modes. Moreover, the microbends can be formed in a preset number to induce a perfect mode conversion between different modes.

The efficiencies of mode coupling at the microbends can be different by differently removing the stresses on the microbends. For this, it is preferable that microbends are formed by locally heating the optical fiber with electrical arcs of different intensity.

High performance optical devices, which can be achieved by adopting the above asymmetric fiber grating, will now be described.

[Single-mode Optical Fiber Notch Filter]

Figure 7:
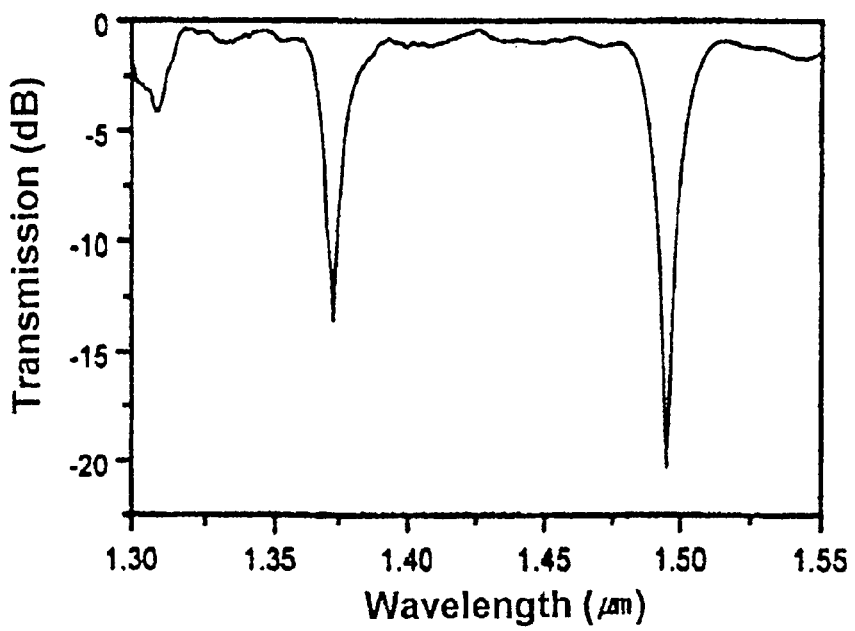
FIG. 7 is a graph showing the filter spectrum of a long-period fiber grating fabricated using an optical communication grade single mode fiber.

FIG. 7 is a graph showing the filter spectrum of a long-period fiber grating fabricated using an optical communication grade single mode fiber. The long-period fiber grating is completed by forming 75 microbends on the single mode fiber at a period of 600 microns. Referring to FIG. 7, three notches at different wavelengths can be observed, which are the results of optical losses that a core mode light are entirely absorbed in a fiber jacket after being converted into different cladding modes $LP_{12}$, $LP_{13}$ and $LP_{14}$. The center wavelength of the filter can be shifted by changing the period of the fiber grating.

[Dual-mode Optical Fiber Mode Converter]

Figure 8:
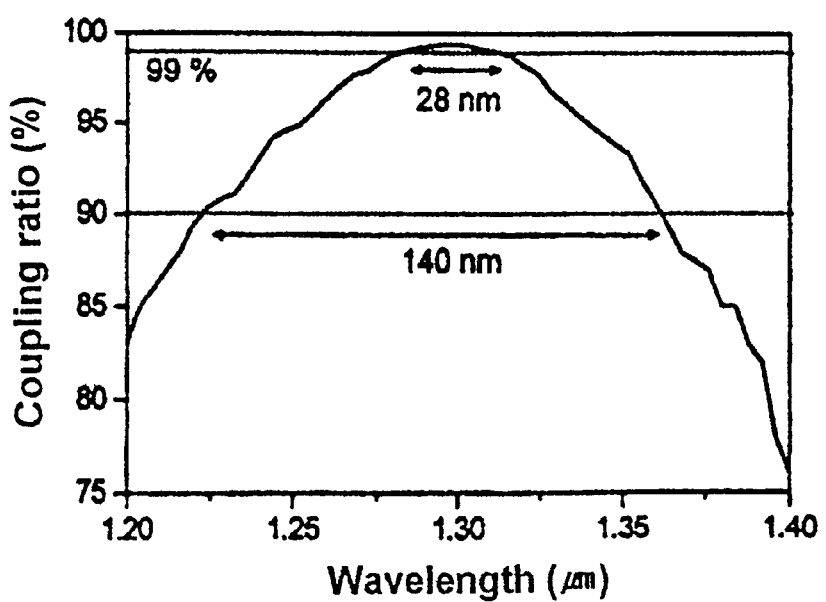
FIG. 8 is a graph of mode coupling ratio versus the wavelength of a light propagating through a dual-mode optical fiber mode converter according to the present invention.

FIG. 8 is a graph of mode coupling ratio versus the wavelength of a light propagating through a dual-mode optical fiber mode converter according to the present invention. The mode converter was fabricated by forming 13 microbends on the dual-mode optical fiber at a period of 515 microns. The dual-mode optical fiber is a specific one that can propagate core modes of $LP_{01}$ and $LP_{11}$ at 1300 nm while maintaining their polarizations. A mode conversion efficiency of 99% or more over a wavelength range of 28 nm can be obtained around 1300 nm. The converted $LP_{11}$ mode is not a cladding mode but a core mode, so that the light can propagate in the optical fiber without loss. Since such a mode conversion within the dual-mode optical fiber can be absolutely made only by an asymmetric grating, a conventional symmetrical optical fiber grating is useless for this mode conversion.

[Optical Fiber Polarizer]

A polarization maintaining optical fiber is made to have different effective refractive indices for two polarizations of a core mode. When the fiber grating according to the present invention is fabricated using such a polarization maintaining optical fiber, and light is incident upon the fabricated fiber grating, the mode conversion wavelength varies with the polarization of the light as shown in Equation 1. Thus, a specific wavelength region can allow mode conversion with respect to only one polarization by equalizing the period of the polarization maintaining optical fiber grating to the beat length of two coupling modes of the one polarization. However, the period of the polarization maintaining fiber grating must be greatly different from the beat length of two coupling modes of the other polarization. Therefore, the optical fiber grating according to the present invention can be used as an optical fiber polarizer by further comprising means for removing only the mode-converted polarization.

[Optical Fiber Wavelength Tunable Bandpass Filter and Frequency Shifter]

Figure 9:
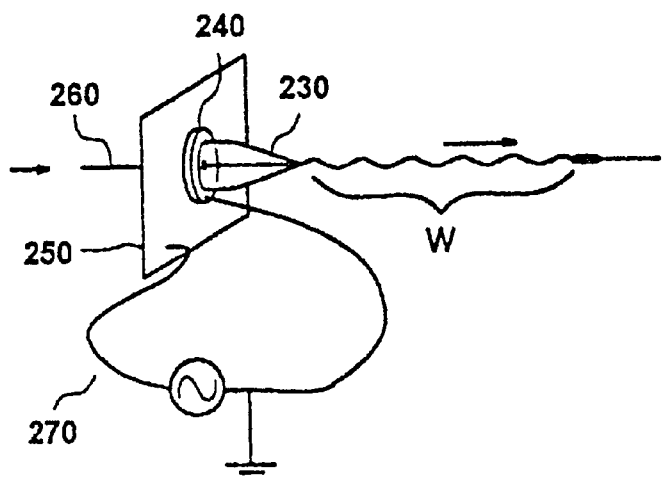
FIG. 9 is a schematic view of a well-known acousto-optic optical fiber device.

An acousto-optic optical fiber device, an optical fiber device for constituting an optical fiber wavelength tunable bandpass filter according to the present invention, will now be described before the optical fiber wavelength tunable bandpass filter. FIG. 9 is a schematic view of a well-known acousto-optic optical fiber device. Referring to FIG. 9, a first through hole is made through the cusp of a glass cone 230, and second and third through holes are respectively made through a thin cylindrical piezoelectric device 240 and a metal support board 250. The glass cone 230, the piezoelectric device 240, and the metal support board 250 are attached to each other so that the first, second, and third through holes are aligned. A single-mode optical fiber 260 with its jacket stripped passes through these through holes. One surface of the piezoelectric device 240 contacts the flat surface of the glass cone 230, and the other surface thereof is attached to the metal support board 250 by a conductive adhesive. The cusp of the glass cone 230 is also attached to the optical fiber 260. An alternating voltage source 270 is connected to both ends of the piezoelectric device 240 to apply an alternating voltage with a tunable frequency thereto. When a mechanical vibration is generated in the piezoelectric device 240 by applying the alternating voltage to both ends of the piezoelectric device 240, it is transmitted to the optical fiber 260 via the cusp of the glass cone 230, thus producing a wave (W) of microbends along the optical fiber, i.e., an optical fiber acoustic grating. When the period of this grating is equal to the beat length between two modes, e.g. $LP_{01}$ and $LP_{11}$ modes, which can pass through the optical fiber 260, mode conversion occurs between the two modes. In order to produce microbends with this specific period on the optical fiber, the piezoelectric device 240 is driven with an alternating voltage with a specific frequency corresponding to the microbends. While mode conversion occurs, the frequency of light passing through the optical fiber is also shifted by this specific frequency. When the propagation distance of a flexural acoustic wave is controlled to be about 10 cm, the mode conversion wavelength width of the grating becomes several nanometers. In the acousto-optic optical fiber device using this acoustic grating, the period of the acoustic grating is easily controlled with the change of the alternating voltage frequency, so that the center of a mode conversion wavelength can also be easily controlled. Thus, this device is applicable to various optical devices such as a mode converter, a wavelength tunable filter, a frequency shifter, and an optical switch, etc.

Figure 10:
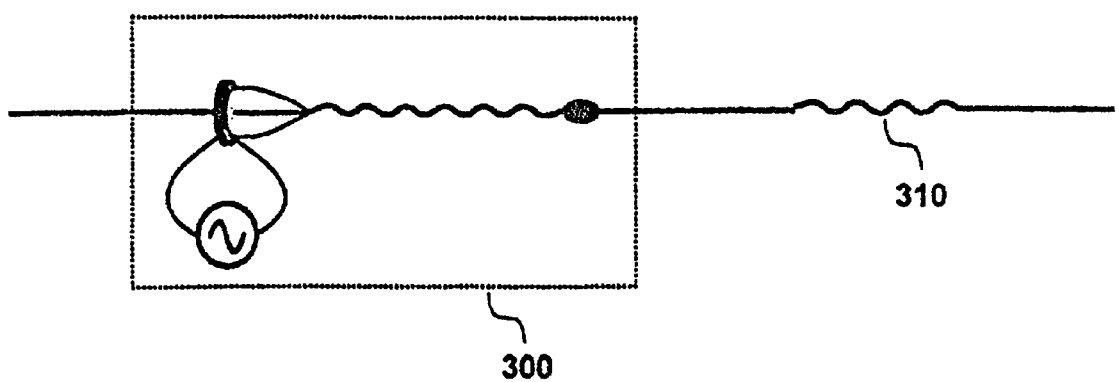
FIG. 10 is a schematic view of an optical fiber wavelength tunable bandpass filter realized by using both the acousto-optic optical fiber device of FIG. 9 and the fiber grating according to the present invention

FIG. 10 is a schematic view of an optical fiber wavelength tunable bandpass filter realized by using both the acousto-optic optical fiber device of FIG. 9 and the fiber grating according to the present invention. Referring to FIG. 10, an acousto-optic optical fiber device 300 and an optical fiber grating 310 according to the present invention are connected to each other in series. The acousto-optic optical fiber device 300 has a certain predetermined wavelength width and tunable center wavelength for a mode conversion of an incident light. The optical fiber grating 310 connected to the acousto-optic optical fiber device 300 induces a mode coupling asymmetric to its own axis and has a mode conversion wavelength width broader than that of the acousto-optic optical fiber device 300. Thus, the passing light is almost entirely converted into a desired mode by the optical fiber grating 310, among which only a light of a predetermined wavelength with about several nm wavelength width is converted into a $LP_{01}$ core mode by the acousto-optic optical fiber device 300. Here, a bandpass-type filter spectrum can be obtained by adding means for removing light other than the $LP_{01}$ mode. Undoubtedly, the frequency of transmitted light increases or decreases by the frequency of a flexural acoustic wave.

If the acousto-optic optical fiber device 300 and the optical fiber grating 310 according to the present invention has the same mode conversion wavelength width, the transmitted light is only frequency shifted by the frequency of a flexural acoustic wave without mode conversion. Thus, this optical fiber wavelength tunable bandpass filter can be used as an optical fiber frequency shifter. In this case, an additional mode stripper is not necessary.

A conventional optical fiber wavelength tunable bandpass filter and a frequency shifter have been fabricated by using dual-mode optical fibers, but those according to the present invention can be fabricated by only single-mode optical fibers. Also, unlike the case of using dual-mode optical fibers, polarization dependency of the devices is significantly reduced.

As described above, the fiber grating and the optical fiber devices using the same are simply fabricated without requiring a special optical fiber. Also, an entirely short optical fiber device can be fabricated on virtue of the high mode coupling efficiency of the fiber grating. Furthermore, on account of a high mechanical durability and a long-term stability of the device, degradation of the optical fiber device due to a change in the characteristics of the grating can be prevented even after a long time at high temperature. In particular, the fiber grating according to the present invention has asymmetric mode coupling characteristics, so that it can be prevalently applied to an optical fiber notch filter, an optical fiber polarizer, an optical fiber wavelength tunable bandpass filter, an optical fiber frequency shifter, etc.

What is claimed is:

1. A fiber grating for inducing a coupling between different light modes, comprising:
   a length of an optical fiber having a fiber axis; and
   a plurality of microbends formed along the length of the optical fiber, each of said microbends being stress relieved,
   wherein said plurality of microbends comprises plural steps formed along the length of the optical fiber out of the fiber axis.

2. The fiber grating of claim 1, wherein said microbends are spaced apart by a periodic distance substantially equal to a beat length of the different modes to be coupled and the number of said microbends is preset to obtain a perfect mode-coupling.

3. The fiber grating of claim 1, wherein said microbends are spaced apart by nonuniform distances.

4. The fiber grating of claim 1, wherein said microbends are stress relieved to different degrees.

5. The fiber grating of claim 1, wherein said stepped microbends are formed by locally heating the optical fiber while applying mechanical stress on one side of the fiber in a direction perpendicular to the length of the fiber.

6. The fiber grating of claim 5, wherein the local heating is carried out using an electric arc discharger.

7. The fiber grating of claim 6, wherein said microbends are heated with different arc intensity so as to relieve the stress to different degrees.

8. An optical fiber device having a polarization-dependent mode-coupling ratio, comprising:
   a length of an optical fiber having polarization-dependent effective refractive index and a fiber axis; and
   a plurality of microbends formed along the length of the optical fiber;
   wherein each of said microbends is stress relieved and said microbends are spaced apart by a periodic distance substantially equal only to a beat length of two coupling modes for any one polarization component, wherein said plurality of microbends comprises plural steps formed along the length of the optical fiber out of the fiber axis.

9. The optical fiber device of claim 8, wherein said optical fiber is a polarization maintaining optical fiber or an elliptic core optical fiber.

10. The optical fiber device of claim 8, further comprising a mode stripper for removing mode converted polarization component.

11. An optical fiber wavelength tunable bandpass filter comprising:

an acoustic grating made by introducing a flexural acoustic wave into a single mode fiber, said acoustic grating having predetermined wavelength width and tunable center wavelength for a mode conversion of a passing light;

a fiber grating connected to said acoustic grating in series, said fiber grating inducing a mode coupling asymmetric to its own axis, said fiber grating having a mode conversion wavelength width broader than that of said acoustic grating; and a mode stripper for removing an asymmetric mode light passed through both the fiber grating and acoustic grating;

wherein said band pass filter passes only light of said predetermined mode conversion wavelength width at a desired wavelength.

12. The optical fiber wavelength tunable bandpass filter of claim 11, wherein said fiber grating is comprised of:

a length of an optical fiber; and a plurality of stepped microbends formed along the length of the optical fiber, each of said microbends being stress relieved.

13. An optical fiber frequency shifter comprising:

an acoustic grating made by introducing a flexural acoustic wave into a single mode fiber, said acoustic grating producing both mode conversion and frequency shift for a passing light; and a fiber grating connected to said acoustic grating in series, said fiber grating inducing a mode coupling asymmetric to its own axis so as to reconvert the mode converted in the acoustic grating into its original mode without frequency shift.

14. The optical fiber frequency shifter of claim 13, wherein said fiber grating is comprised of:

a length of an optical fiber; and a plurality of stepped microbends formed along the length of the optical fiber, each of said microbends being stress relieved.

* * * * *

UNITED STATES PATENT AND TRADEMARK OFFICE
CERTIFICATE OF CORRECTION

PATENT NO.    : 6,430,342 B1  
DATED         : August 6, 2002  
INVENTOR(S)   : Kim et al.

It is certified that error appears in the above-identified patent and that said Letters Patent is hereby corrected as shown below:

Title page,  
Item [56], References Cited, OTHER PUBLICATIONS, "Huang et al.," reference, "Transducers: S1ngle Fiber" should read -- Transducers: Single Fiber --.

Drawings,  
Figs 1-5, insert the title -- (Prior Art) --

Column 3,  
Line 10, "on the fiber-weaken" should read -- on the fiber weaken --.

Signed and Sealed this

Thirtieth Day of December, 2003

JAMES E. ROGAN  
*Director of the United States Patent and Trademark Office*